No. 755,416. PATENTED MAR. 22, 1904.
C. TUCKFIELD.
MECHANISM FOR CONVERTING RECIPROCATING INTO ROTARY
MOTION AND VICE VERSA.
APPLICATION FILED MAR. 12, 1900.
NO MODEL.
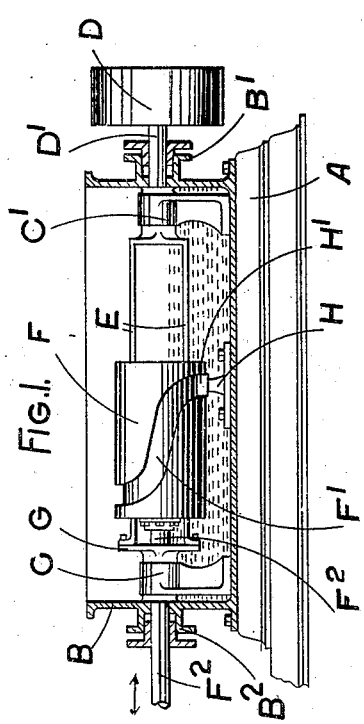
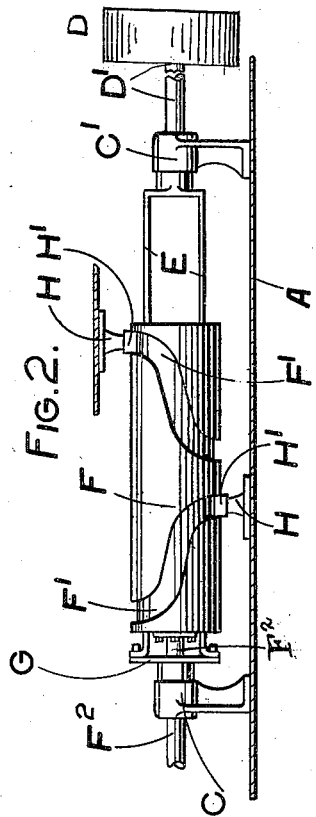
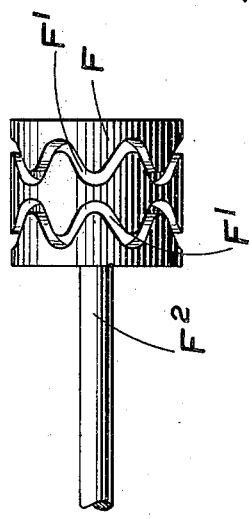

No. 755,416. Patented March 22, 1904.

UNITED STATES PATENT OFFICE.

CHARLES TUCKFIELD, OF EAST MOLESEY, ENGLAND.

MECHANISM FOR CONVERTING RECIPROCATING INTO ROTARY MOTION, AND VICE VERSA.

SPECIFICATION forming part of Letters Patent No. 755,416, dated March 22, 1904.

Application filed March 12, 1900. Serial No. 8,386. (No model.)

*To all whom it may concern:*

Be it known that I, CHARLES TUCKFIELD, a subject of the Queen of England, residing at East Molesey, England, have invented certain new and useful Improvements in or Relating to Mechanism for Converting Reciprocating into Rotary Motion, and Vice Versa, (for which I have made application for Letters Patent in Great Britain under No. 21,259, dated September 2, 1899, and in Western Australia under No. 2,662, dated September 2, 1899,) of which the following is a specification.

This invention relates to mechanism for converting reciprocating into rotary motion, and vice versa, its object being to provide a cheap and simple construction of such mechanism the parts of which shall be easily accessible for the purposes of lubrication and the like.

According to the present invention a reciprocating member is provided which has formed upon its exterior surface an endless spiral. A rotary member is also provided and is joined to the reciprocating member by a connection which in relation to them is movable endwise, but not rotatable. A stationary abutment is secured in a convenient position, so as to engage with the spiral on the reciprocating member. The mechanism may, if desired, be inclosed within an oil-bath.

In the accompanying drawings, Figure 1 is an elevation of mechanism constructed according to this invention situated within an oil-bath, which is shown in longitudinal section. Fig. 2 is an elevation, partly in section, showing a modification in the arrangement of spirals on the reciprocating member. Fig. 3 is an elevation of the reciprocating member, showing a further modification in the arrangement of spirals.

Like letters indicate like parts throughout the drawings.

Upon a base-plate A a tank B is mounted and is adapted to contain a lubricant, so as to serve as an oil-bath. Bearings C C' are secured within the tank B. A rotary member D is mounted outside the tank B upon a short shaft D', carried in the bearing C', the shaft D' passing through a stuffing-box B'. Within the tank the shaft D' is forked, so as to form two driving-rods E not in alinement with the central axis of the rotary member D.

Mounted upon the driving-rods E and having its central axis in alinement with that of the rotary member D is a reciprocating member F in the form of a cylinder. An endless spiral groove F' is formed upon the exterior periphery of the reciprocating member F, the groove F' being right-handed for half a turn and left-handed for the other. The driving-rods E extends through the reciprocating member F, suitable holes or recesses being formed in the latter for this apparatus. On that side of the cylinder F remote from the rotary member D the driving-rods E are secured to a yoke G, mounted in the bearing C. A shaft or the like $F^2$ is secured to this end of the reciprocating member F, passing through a central aperture in the yoke G and through a stuffing-box $B^2$ on the tank B. A stationary abutment H is secured within the tank and is provided with a roller H', engaging with the spiral groove F' on the reciprocating member F. On reciprocating the member F by any convenient means—say by connecting the shaft $F^2$ to the piston of any reciprocating engine—it will move along the driving-rods E and in so doing the abutment H H', engaging with the spiral groove F', will cause the reciprocating member to rotate. Owing to the reciprocating member F being mounted upon the driving-rods E and the latter not being coaxial either with it or with the rotary member D, the rotation of the reciprocating member F will be communicated by them to the rotary member D.

If desired, two or more endless spirals may be formed upon the cylinder F. It is preferred that the two endless spirals should be opposed to one another, as shown in Fig. 2, and in this case there will be two abutments H, each engaging with one of the spirals and arranged at opposite ends of a diameter of the cylinder F.

If desired, a zigzag of spirals may be employed, as shown in Fig. 3, and there may be two or more series of such zigzags, which may be opposed to one another.

By employing opposed spirals the simultaneous thrusts set upon them by their respective abutments and operating on opposite sides of the cylinder act to relieve the bearings of unbalanced stress such as would come upon them in the case of a single spiral.

What I claim as my invention, and desire to secure by Letters Patent, is—

1. In mechanism of the kind described the combination of a reciprocating rod, a member fixed thereto having an endless spiral groove, a stationary member to engage the groove, a rotatory member, a driving-rod extending through the reciprocating member but held from reciprocating with it, a means for supporting the ends of the driving-rod outside the reciprocating member, substantially as set forth.

2. In mechanism of the kind described, the combination with a reciprocating member having two opposite endless spiral grooves, of fixed abutments, one engaging each groove, and situated on opposite sides of the reciprocating member, substantially as set forth.

In testimony whereof I have signed my name to this specification in the presence of two subscribing witnesses.

CHARLES TUCKFIELD.

Witnesses:
A. H. GREENWOOD,
WALTER J. SKERTEN.